(12) United States Patent
Balachandran et al.

(10) Patent No.: US 7,087,211 B2
(45) Date of Patent: Aug. 8, 2006

(54) HYDROGEN PRODUCTION BY HIGH TEMPERATURE WATER SPLITTING USING ELECTRON CONDUCTING MEMBRANES

(75) Inventors: Uthamalingam Balachandran, Hinsdale, IL (US); Shuangyan Wang, Hinsdale, IL (US); Stephen E. Dorris, LaGrange Park, IL (US); Tae H. Lee, Naperville, IL (US)

(73) Assignee: The University of Chicago, Chicago, IL (US)

( * ) Notice: Subject to any disclaimer, the term of this patent is extended or adjusted under 35 U.S.C. 154(b) by 531 days.

(21) Appl. No.: 10/669,832

(22) Filed: Sep. 24, 2003

(65) Prior Publication Data

US 2004/0098914 A1  May 27, 2004

Related U.S. Application Data

(63) Continuation-in-part of application No. 10/245,039, filed on Sep. 17, 2002, now Pat. No. 6,726,893.

(51) Int. Cl.
*C01B 3/08* (2006.01)
*B01D 53/22* (2006.01)

(52) U.S. Cl. ............... 423/658.2; 96/7; 96/8; 96/10; 95/54; 95/55; 95/56; 422/239; 423/579; 423/648.1

(58) Field of Classification Search ............ None
See application file for complete search history.

(56) References Cited

U.S. PATENT DOCUMENTS

| | | | |
|---|---|---|---|
| 5,030,661 A | 7/1991 | Lywood | |
| 5,094,927 A | 3/1992 | Baucke et al. | |
| 5,447,559 A | 9/1995 | Rao et al. | |
| 5,580,497 A | 12/1996 | Balachandran et al. | |
| 5,639,437 A | 6/1997 | Balachandran et al. | |
| 5,645,626 A | 7/1997 | Edlund et al. | |
| 5,723,074 A | 3/1998 | Balachandran et al. | |
| 5,725,633 A | 3/1998 | Ozcayir et al. | |
| 6,066,307 A * | 5/2000 | Keskar et al. | 423/648.1 |
| 6,235,417 B1 | 5/2001 | Wachsman et al. | |
| 6,569,226 B1 | 5/2003 | Dorris et al. | |
| 2001/0001379 A1* | 5/2001 | Wachsman et al. | 95/55 |

FOREIGN PATENT DOCUMENTS

EP 0399833 11/1990

* cited by examiner

*Primary Examiner*—Colleen P. Cooke
*Assistant Examiner*—Paul Wartalowicz
(74) *Attorney, Agent, or Firm*—Emrich & Dithmar LLC

(57) ABSTRACT

A device and method for separating water into hydrogen and oxygen is disclosed. A first substantially gas impervious solid electron-conducting membrane for selectively passing protons or hydrogen is provided and spaced from a second substantially gas impervious solid electron-conducting membrane for selectively passing oxygen. When steam is passed between the two membranes at dissociation temperatures the hydrogen from the dissociation of steam selectively and continuously passes through the first membrane and oxygen selectively and continuously passes through the second membrane, thereby continuously driving the dissociation of steam producing hydrogen and oxygen. The oxygen is thereafter reacted with methane to produce syngas which optimally may be reacted in a water gas shift reaction to produce $CO_2$ and $H_2$.

28 Claims, 3 Drawing Sheets

HYDROGEN PRODUCTION BY HIGH TEMPERATURE WATER SPLITTING USING ELECTRON CONDUCTING MEMBRANES

RELATED APPLICATIONS

This application is a continuation-in-part of application U.S. Ser. No. 10/245,039 filed Sep. 17, 2002 now U.S. Pat. No. 6,726,893.

The United States Government has rights in this invention pursuant to Contract No. W-31-109-ENG-38 between the U.S. Department of Energy (DOE) and The University of Chicago representing Argonne National Laboratory.

BACKGROUND OF THE INVENTION

This invention relates to a method and device for the production of hydrogen by water splitting as well as combining oxygen from the water splitting to produce syngas and optionally subjecting the syngas to a water gas shift reaction to produce carbon dioxide and hydrogen.

Global environmental concerns have ignited research to develop energy generation technologies which have minimal ecological damage. Concerns of global climate change are driving nations to develop electric power generation technologies and transportation technologies which reduce carbon dioxide emissions. Hydrogen is considered the fuel of choice for both the electric power and transportation industries.

The need to generate ever larger amounts of hydrogen is clear. Outside of direct coal liquefaction, other major industrial activities, such as petroleum refining, also require hydrogen. Collectively, petroleum refining and the production of ammonia and methanol consume approximately 95 percent of all deliberately manufactured hydrogen in the United States. As crude oil quality deteriorates, and as more stringent restrictions on sulfur, nitrogen and aromatics are imposed, the need for more hydrogen for the refining industry will increase.

Hydrogen production, as a consequence of other processes, is significant. A number of industries requiring hydrogen produce effluents containing significant amounts of unused hydrogen. However, this hydrogen requires clean-up prior to re-use. Furthermore, hydrogen is produced from the combustion of oil, methane, coal, and other petroleum-based materials. However, this hydrogen must be separated from other combustion gases, namely carbon dioxide, in order to be of use.

Petroleum refineries currently use cryogenics, pressure swing adsorption (PSA), and membrane systems for hydrogen recovery. However, each of these technologies have their limitations. For example, because of its high costs, cryogenics generally can be used only in large-scale facilities which can accommodate liquid hydrocarbon recovery.

Membrane-based PSA systems require large pressure differentials across membranes during hydrogen diffusion. This calls for initial compression of the feed prior to contact to the upstream side of polymeric membranes and decompression of the permeate to facilitate final purification steps. Not only are these compression steps expensive, but PSA recovers less feedstream hydrogen and is limited to modest temperatures. U.S. Pat. No. 5,447,559 to Rao discloses a multi-phase (i.e. heterogenous) membrane system used in conjunction with PSA sweep gases.

Many membrane systems have been developed in efforts to efficiently extract target material from feed streams. Some of these membrane systems (U.S. Pat. Nos. 5,030,661, 5,645,626, and 5,725,633) are synthetic based and incorporate polyamides and polyethersulphones. Such organic membranes also have limited temperature tolerance.

Proton-exchange membranes have high proton conductivities, and as such, are currently in development for fuel-cell applications and hydrogen pumps. One such application is disclosed in U.S. Pat. No. 5,094.927 issued to Baucke on Mar. 10, 1992. However, inasmuch as these membranes have relatively low electronic conductivities, they are not viable for hydrogen recovery scenarios, primarily because these membranes require the application of an electric potential to drive proton transport.

Water dissociates into oxygen and hydrogen at high temperatures, and the dissociation increases with increasing temperature:

$$H_2O(g) \Leftrightarrow H_2 + \tfrac{1}{2}O_2 \qquad (1)$$

Because of the small equilibrium constant of this reaction, the concentrations of generated hydrogen and oxygen are very low even at relatively high temperatures, i.e., 0.1 and 0.042% for hydrogen and oxygen, respectively at 1600° C. However, significant amounts of hydrogen or oxygen could be generated at moderate temperatures if the equilibrium were shifted toward dissociation. While hydrogen can also be produced by high-temperature steam electrolysis, the use of a variety of membranes including mixed-conducting membranes offers the advantage of requiring no electric power or electrical circuitry. In considering the above dissociation equation, it appears at first blush that the removal of either hydrogen or oxygen would continue to drive the reaction toward dissociation. However, that is not the entire case as will be hereinafter set forth.

Oxygen derived from reaction (1) can be combined with methane to form syngas:

$$CH_4 + \tfrac{1}{2}O_2 \rightarrow CO + H_2 \qquad (2)$$

The syngas can be used as a fuel or the $H_2$ can be collected and combined with the $H_2$ from reaction (1). Additionally, the syngas can be subjected to a water gas shift reaction to generate additional hydrogen:

$$2CO + 3H_2 \xrightarrow[\text{catalyst}]{H_2O} 2CO_2 + 5H_2 \qquad (3)$$

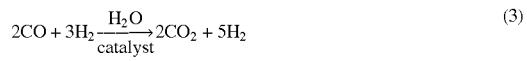

SUMMARY OF THE INVENTION

An object of the invention is to provide a device and method for splitting water into its component parts wherein the driving force of the reaction remains relatively high.

Another object of the invention is to provide a device and method for dissociating water into oxygen and hydrogen using substantially gas impervious solid electron-conducting membranes selectively removing the components of the dissociation reaction and thereafter optionally reacting the oxygen with methane to produce syngas, which optionally may be reacted to produce additional hydrogen.

Yet another object of the present invention is to provide a device and method for producing hydrogen and syngas by splitting water into hydrogen and oxygen in which membranes are used which selectively pass atomic hydrogen or protons on the one hand, and selectively pass atomic oxygen or oxide ions on the other hand.

Yet another object of the present invention is to provide a device and method of water splitting in which either single or two-phase membranes are used selectively to separate hydrogen and oxygen after dissociation and separate hydrogen from syngas produced by reaction of oxygen and methane.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE PREFERRED EMBODIMENT

Figure 1:
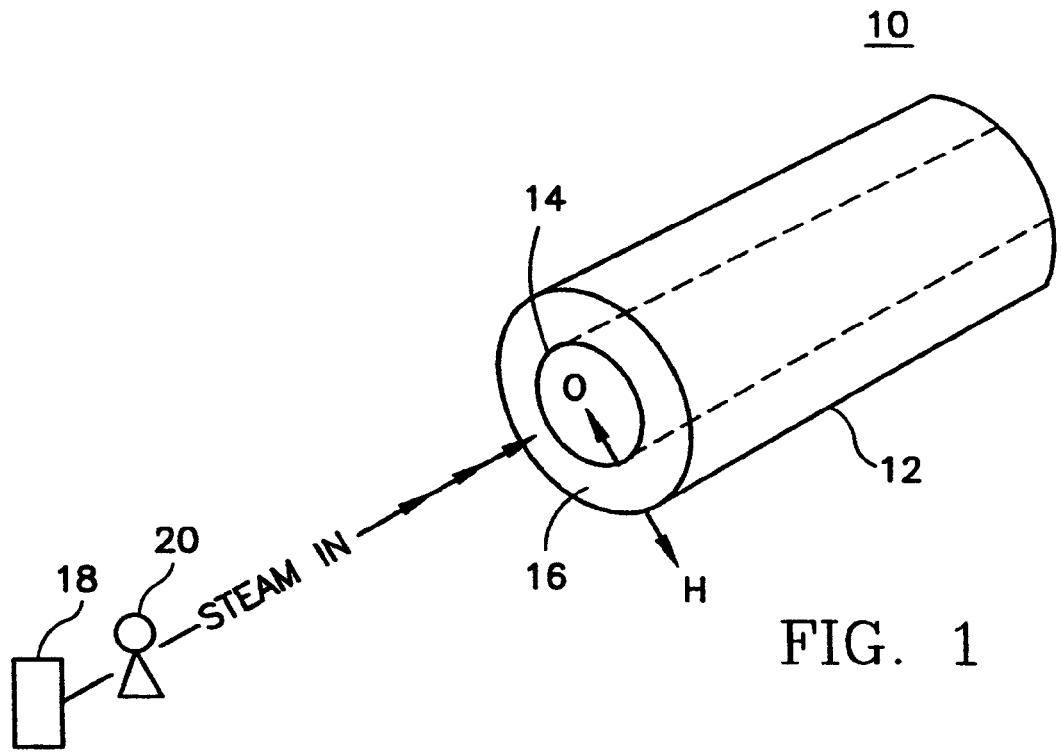
FIGS. 1 and 2 show alternate embodiments of a device for producing hydrogen by high temperature water splitting.

There are a wide variety of membranes which are available that selectively pass hydrogen either as atomic hydrogen or as protons and are well known in the art. For instance, the Wachsman et al. U.S. Pat. No. 6,235,417, issued May 22, 2001 lists a large number of two-phase proton and electron conductor membranes of conductive oxides which may or may not be perovskites. The disclosure of the aforementioned '417 patent is herein incorporated in its entirety. In the Wachsman et al. patent, two-phase conductors are shown which are useful in the present invention and in which a metal such as palladium is used as an independent phase in the conductor. However, in addition to palladium and its alloys, other metals which may be used in this invention include Pt, Fe, Co, Cr, Mn, Nb, Zr, Ta, V, Ni, Au, Cu, Rh, and Ru. Not only are the alloys of the aforementioned metallic elements useful as a distinct phase in the membrane for selectively removing hydrogen in the present invention, but also various mixtures of the elements and/or their alloys and/or their electron-conducting oxides are included in the invention.

The hydrogen permeable membrane may also include an oxide of the $ABO_3$ formula wherein A is selected from the group consisting of Ba, Ca, Mg and Sr (generally the alkaline earth metals) and B is $Ce_xM_x$ or $Zr_xM_x$, or $Sn_xM_x$, where x is greater than zero and less than one and M is selected from Ca, Y, Yb, In, Gd, Nd, Eu, Sm, Sr, Mg and Tb. As disclosed in a co-pending patent application Ser. No. 09/192,115, filed Nov. 13, 1998 entitled Proton-Conducting Membrane Comprising Ceramic, A Method For Separating Hydrogen Using Ceramic Membranes, the entire disclosure of which is herein incorporated by reference, mixed oxides of the type disclosed therein in which the oxide is of the general formula $ABO_3$ wherein A is selected from the group consisting of Ba, Ca, Mg and Sr and B is selected from Ce, or Zr, or Sn, which may or may not be doped wherein the dopant is selected from Ca, Y, Yb, In, Nd, Gd, Sr and Mg or combinations thereof are also useful in the present invention. Moreover, the catalytic metal in the above-disclosed mixed oxides may be selected from Pt, Pd, Fe, Co, Cr, Mn, V, Nb, Zr, Y, Ni, Au, Cu, Rh, Ru, their alloys and mixtures thereof. These membranes are useful for selectively transmitting protons, wherein the membrane has a thickness of between about 0.002 and about 5 millimeters.

In addition to membranes which transmit protons, as illustrated in the aforementioned '417 patent and the aforementioned '115 application, membranes made of certain metals will selectively transport atomic hydrogen. These are single phase membranes and include membranes of Pd, Nb, V, Ta, Zr, their alloys and mixtures thereof. Metals such as those above noted may be supported or unsupported. When supported, the membranes may be supported by an oxide or another metal, for instance, alumina as well as yttria stabilized zirconia or $SiO_2$ may be used as oxide ceramics to support the above-mentioned metals. In addition, other metals may be used as supports for the above-identified metals, for instance, Cu may be used as a support metal for Nb.

Where a two-phase hydrogen transmitting membrane is used in which one phase is a mixed oxide ceramic and the other phase is a metal, the metal acts as an electron-conducting portion of the membrane and is generally preferred to be present in the range of between about 30% by volume and about 60% by volume. Most preferably, in a two-phase membrane, the membrane is a homogenous mixture of a ceramic oxide and an electron conductor, such as disclosed in U.S. Pat. No. 6,569,226 issued to Dorris et al. May 27, 2003, the entire disclosure of which is herein incorporated by reference.

To summarize, the hydrogen conducting membrane of the present invention may conduct either atomic hydrogen or protons. Where the membrane conducts protons, it may be of the type disclosed in the '417 patent or the aforementioned '115 application and it is intended that this invention will include each and every proton conducting membrane disclosed in either of these documents. Where the membrane conducts or is permeable to hydrogen, it may be of the type disclosed in the '226 patent.

An oxygen conducting membrane is also required in the present invention. The oxygen conducting membranes of the invention may either conduct atomic oxygen or oxygen ions, and there are a wide variety of materials which function selectively to pass oxygen but not hydrogen. For instance, atomic oxygen may be passed through a silver or silver alloy membranes. These membranes like the single phase metal membranes disclosed for passing hydrogen are single phase materials which may be supported or unsupported and function selectively to pass oxygen in the presence of hydrogen. Two-phase materials as well as single phase materials are also function as membranes in the present invention and perovskite oxides as well as other oxides having the general formula of $ABO_3$ are also suitable as the oxygen passing membrane in the subject invention.

European patent application no. 90305684.4 filed May 24, 1990 by Cable et al. assigned to Standard Oil Company, publication no. A10399833, the entire disclosure of which is herein incorporated by reference, discloses a large number of oxygen ion conducting materials which are substantially gas impervious and are multi-phase mixtures of electronically conducting material and oxygen ion conductive material. It is intended that the invention disclosed herein cover all the multi-phase membranes disclosed in the aforementioned EPO patent application along with single phase materials which transmit oxygen selectively at the operating conditions of the present invention.

More particularly, the present invention includes silver or silver alloys supported and unsupported membranes along with membranes which are electron-conducting membranes of a mixed metal perovskite oxide having a formula $ABO_3$ wherein A is one or more of the lanthanides, Y and the rare earth metals and B is one or more of the first row of transition metals. More particularly, this invention covers oxygen selective membranes which are substantially gas impervious that are two-phase materials in which the first phase is a mixed metal oxide of the type previously discussed in the sentence above and the second phase is one or more of Ag, Au, Pt, Rh, Ni, Cu, Ru, Co, their alloys, their electron-conducting oxides and mixtures thereof. Most particularly, the selective oxygen conducting membrane of the present invention is preferably a mixture of Gd doped $CeO_2$ and Ni and/or a mixture of $Y_2O_3$ stabilized $ZrO_2$ and Ni and/or Sr—Fe—Co oxide as disclosed in U.S. Pat. Nos. 5,580,497 and 5,639,437, the disclosures of which are herein incorporated by reference. More specifically, the preferred oxygen passing membrane is $Gd_{0.2}Ce_{0.8}O_{2-\delta}$ and Ni where Ni is present in the amount of about 30 volume percent to about 60 volume percent and most preferably about 40 volume percent, and $\delta$ is a variable dependent on the extent of doping, as is well known in the pertinent art.

Figure 2:
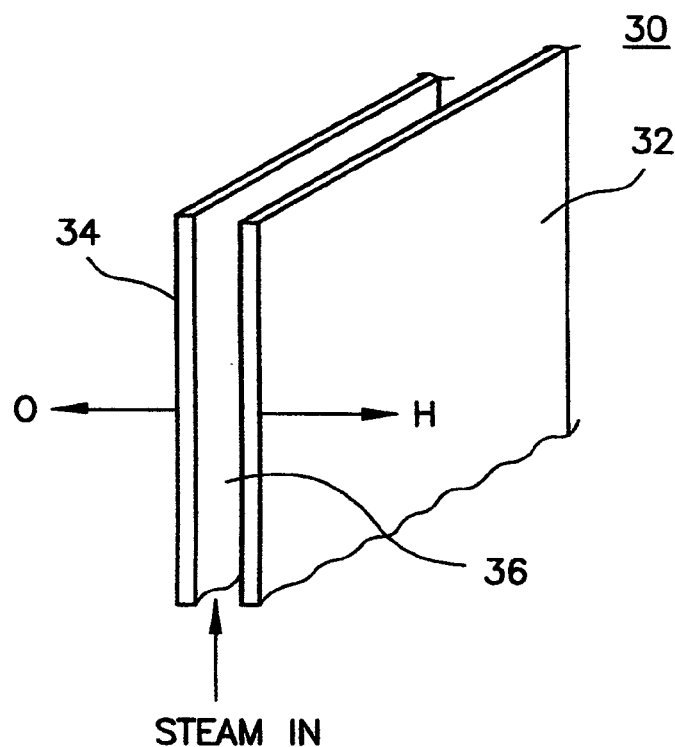

Referring now to FIGS. 1 and 2, there are shown devices for practicing the method of the present invention. More particularly, FIG. 1 illustrates a separator 10 in the form of concentric generally tubular membranes 12 and 14. Membrane 12 is of the type selectively to pass atomic hydrogen or protons whereas membrane 14 is of a type selectively to pass atomic oxygen or oxygen ions, both as previously described. Each of the membranes 12 and 14 are as previously described substantially gas impervious solids, each for selectively passing either hydrogen or protons as in the case of membrane 12 or oxygen as in the case of membrane 14. An annulus 16 is formed between the generally tubular membrane 14 and the generally tubular membrane 12 and receives steam from a source thereof 18 optionally with a pump 20. Preferably, there is a driving force between the gas (steam) in annulus 16 and inside the interior tubular membrane 14 and the exterior of the larger tubular membrane 12, such as if the steam in the annulus 16 is under pressure. Alternately, the environment inside the inner tube 14 may be under vacuum and the environment outside the outer tube 12 may be under vacuum or any combination thereof. Also, the membranes may be reversed with the oxygen passing membrane interior of the hydrogen passing membrane. As previously indicated, the membranes 12 and 14 may have a thickness in the range from about 0.002 millimeters to about 5 millimeters, there being as is well known in the art, a variety of ways of manufacturing membranes of the type herein set forth, both supported and unsupported. The invention includes any combination of membranes wherein one selectively passes hydrogen or protons and the other selectively passes oxygen or oxygen ions to promote the dissociation of steam without requiring external electronic circuitry. Single phase supported membranes have a porous support separate and apart from the membrane and two phase membranes have homogeneously mixed ceramic and method phase. Both are included in the invention.

FIG. 2 illustrates schematically as does FIG. 1 a separator 30 having a first selectively passing hydrogen or proton membrane 32 and a second membrane selectively passing oxygen or oxygen ions 34. The membranes 32, 34 of the separator 30 may be selected from the same materials as previously discussed with respect to the separator 10. There is a space 36 formed between the generally flat membrane 32 and the generally flat membrane 34 into which steam is passed. The steam in the space 36 may be under pressure as described above with respect to separator 10 or the areas outside of the membranes 32 and 34 may be at reduced pressure or any combination thereof. The separator 30 schematically illustrated in FIG. 2 may be combined with manifolds (not shown) to accommodate a plurality of adjacent parallel membranes 32, 37 to provide a parallel flow device or may be any other art recognized means by which steam at high temperature can be passed between membranes, each of which selectively passes either oxygen or hydrogen. The steam dissociation temperature generally should be at not less than about 700° C. and may be substantially greater, such as 1500–1600° C., all as dictated by economics and engineering decisions.

Figure 3:
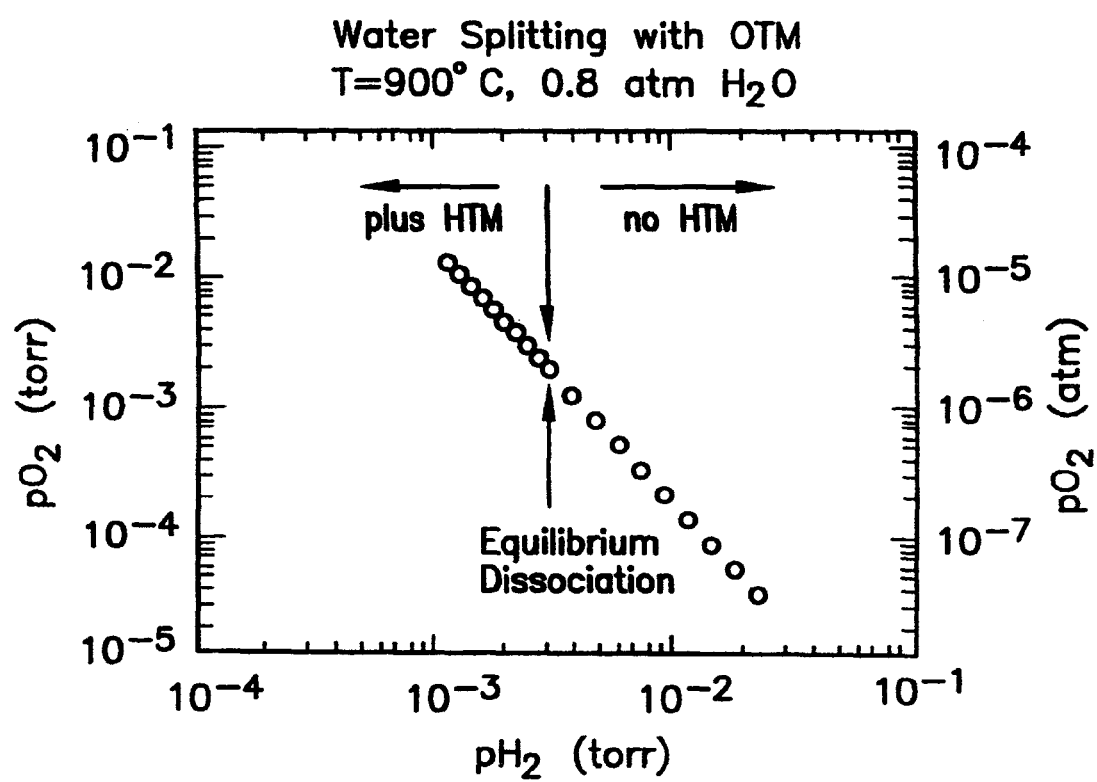
FIG. 3 is a graphical representation showing the relationship between the partial pressures of oxygen and hydrogen with and without hydrogen transport membranes during steam dissociation.

FIG. 3 shows why the obvious method of simply removing oxygen is insufficient to drive the dissociation reaction. FIG. 3 shows the partial pressure of oxygen plotted versus the partial pressure of hydrogen at 900° C. and at eight tenths atmosphere steam with a hydrogen transporting membrane (HTM) and without a hydrogen transporting membrane (HTM). As seen in FIG. 3, as the hydrogen pressure increases (moving to the right of the horizontal axis) the partial pressure of oxygen decreases. As the oxygen concentration drops with the increasing concentration of hydrogen, the driving force of the dissociation reaction of steam diminishes. Therefore, for instance in the separator 10, the driving force of the dissociation reaction of steam at the entrance to the separator 10 will be high, but as the steam proceeds axially along the separator 10, the hydrogen partial pressure increases due to dissociation, but the oxygen partial pressure decreases along with the driving force for steam dissociation. Therefore, it is insufficient to remove only oxygen from the dissociation of steam and still maintain the driving force for steam dissociation. Although not readily apparent, it is necessary in order to maintain steam dissociation rates axially of the separator 10 to remove both the hydrogen and the oxygen as they are produced by dissociation of steam.

Although two specific embodiments of separators are disclosed in FIGS. 1 and 2 of the present application, it is obvious to those of ordinary engineering skill in the pertinent art that a variety of designs may be employed in order to practice the method of the present invention in which steam is separated into its constituent parts of hydrogen and oxygen by providing a first substantially gas impervious solid electron-conducting membrane for selectively passing hydrogen and a second substantially gas impervious solid electron-conducting membrane for selectively passing oxygen, wherein steam is passed in between the two membranes at dissociation temperatures so that as the steam dissociate, each of its constituent gases is removed selectively through each of the membranes thereby maintaining the driving force of the dissociation reaction irrespective of the length of the reactor.

Figure 4:
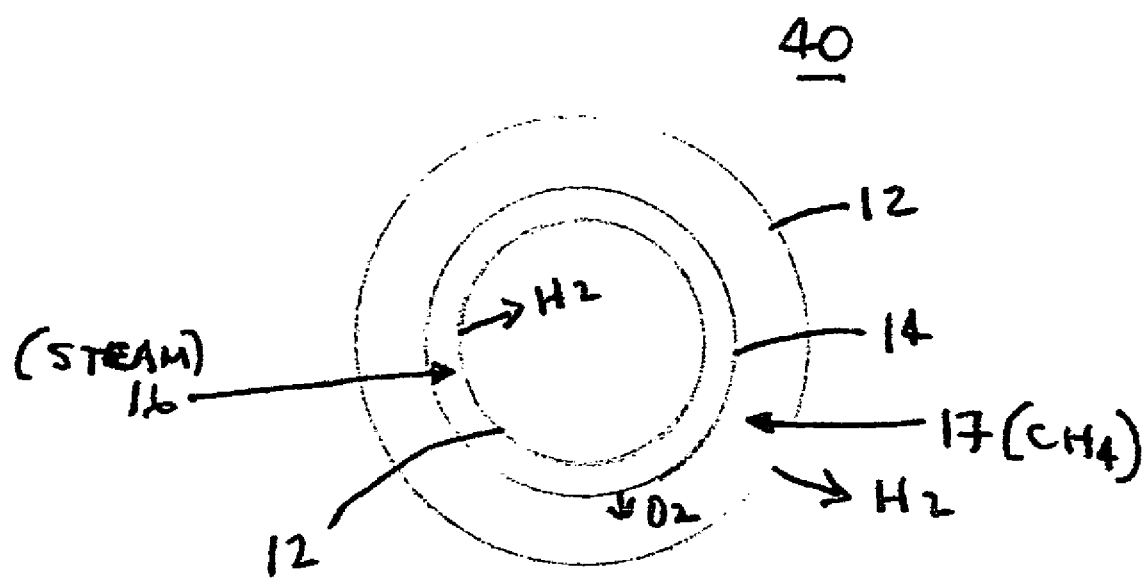
FIG. 4 is another embodiment of the invention for reacting methane to produce syngas and/or $H_2$ and $CO_2$ by a water gas shift reaction.

Referring to FIG. 4, there is disclosed another embodiment 40 of the present invention in which the reactor 40 includes a hydrogen transfer membrane 12 of the type hereinbefore set forth illustrated for purposes of simplicity only as a cylinder surrounded by an oxygen transfer membrane 14 defining a reaction chamber 16 therebetween. Exterior to the oxygen transfer membrane 14 is optionally, but not necessarily, another hydrogen transfer membrane 12. The hydrogen transfer membranes 12 and the oxygen transfer membranes 14 illustrated in embodiment 40 are of the same type previously disclosed with respect to embodiments 10 and 30. The oxygen transfer membrane 14 and the outer hydrogen transfer membrane 12 cooperate to form a reaction chamber 17 therebetween. In the practice of the reactor 40, steam is introduced into the reaction chamber 16 as previously described under conditions that promote dissociation of water into hydrogen and oxygen with the hydrogen passing through the hydrogen transfer membrane 12 and oxygen passing through the oxygen transfer membrane 14. Optionally, a hydrogen transfer membrane 12 may be positioned concentric with and exterior to the oxygen transfer membrane 14 forming the reaction chamber 17 in which methane is introduced, as previously described. The methane reacts with the oxygen transported through the membrane 14 and reacts as set forth in reaction 2 to form syngas, a combination of carbon monoxide and hydrogen. Syngas is useful in and of itself as a fuel or may be further treated in a water shift reaction as is well known using a well known catalyst such as a copper zinc catalyst at 500° C. or greater to produce carbon dioxide and hydrogen as set forth in reaction (3). In the event that the syngas produced by the reaction (2) of methane and oxygen is the desired fuel, then the outer membrane need not be a hydrogen transfer membrane 12 but any material suitable to contain the reaction. In the event that the syngas is reacted in a water shift reaction, the hydrogen can be collected and combined with the hydrogen resulting from the water splitting reaction previously described. A third alternative is to separate the syngas as illustrated with the hydrogen transfer membrane 12 and combine the hydrogen which is separated from the syngas with the hydrogen which is produced from the water splitting reaction, all for purposes hereinbefore described.

The hydrogen conducting membrane used in the embodiment of FIG. 4 as well as the oxygen transfer membrane used in the embodiment of FIG. 4 are the same materials previously described.

While particular embodiments of the present invention have been shown and described, it will be appreciated by those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The embodiments of the invention in which an exclusive property or privilege is claimed are defined as follows:

1. A device for separating water into hydrogen and oxygen and reacting oxygen with methane to form syngas, comprising a first substantially gas impervious solid electron-conducting membrane for selectively passing hydrogen, a second substantially gas impervious solid electron-conducting membrane for selectively passing oxygen, said first and said second membranes being positioned to form a reaction chamber therebetween, mechanism for passing steam at dissociation temperature into said reaction chamber such that hydrogen from the dissociation of steam selectively and continuously passes through said first substantially gas impervious solid electron-conducting membrane and oxygen from the dissociation of steam selectively and continuously passes through said second substantially gas impervious solid electron-conducting membrane thereby continuously driving the dissociation of steam producing hydrogen and oxygen, and mechanism for passing methane into said reaction chamber in the presence of oxygen thereby continuously producing a syngas of carbon monoxide and hydrogen from the reaction of oxygen and methane.

2. The device of claim 1 wherein said first and second substantially gas impervious solid electron-conducting membranes are concentric tubes forming said reaction chamber therebetween.

3. The device of claim 1 wherein said first and second substantially gas impervious solid electron-conducting membranes are concentric tubes forming a first annulus therebetween with steam therein and further comprising another first membrane concentric with said second membrane forming a second annulus therebetween with methane therein, whereby oxygen from the dissociation of steam combines with the methane in said second annulus to form syngas of carbon monoxide and hydrogen.

4. The device of claim 3, wherein the steam is maintained at a positive pressure with respect to the hydrogen and the oxygen.

5. The device of claim 3, wherein the first and second substantially gas impervious solid electron-conducting membranes each has a thickness in the range of from about 0.002 and about 5 millimeters.

6. The device of claim 1, wherein said first substantially gas impervious solid electron-conducting membrane selectively passes atomic hydrogen.

7. The device of claim 1, wherein said first substantially gas impervious solid electron-conducting membrane selectively passes protons.

8. The device of claim 1, wherein said first substantially gas impervious solid electron-conducting membrane is one or more of Pd, Nb, V, Ta, Zr, their alloys and mixtures.

9. The device of claim 8, wherein said first substantially gas impervious solid electron-conducting membrane is supported by an oxide ceramic.

10. The device of claim 9, wherein the oxide ceramic is $Al_2O_3$ or yttria stabilized zirconia or $SiO_2$.

11. The device of claim 8, wherein said first substantially gas impervious solid electron-conducting membrane is supported by a metal.

12. The device of claim 7, wherein said first substantially gas impervious solid electron-conducting membrane is an oxide having a formula of $ABO_3$, wherein A is selected from the group consisting of Ba, Ca, Mg and Sr and B is $Ce_{1-x}M_x$ or $Zr_{1-x}M_x$ or $Sn_{1-x}M_x$ where X is >0 and <1 and M is selected from Ca, Y, Yb, In, Gd, Nd, Eu, Sm, Sr, Mg and Tb.

13. The device of claim 12, wherein an electron conductor is present as a separate phase in said first substantially gas impervious solid electron-conducting membrane and is one or more of Pt, Pd, Fe, Co, Cr, Mn, V, Nb, Ta, Zr, Y, Ni, Au, Cu, Rh, Ru, their alloys, their electron-conducting oxides, and mixtures thereof.

14. The device of claim 13, wherein the electron conductor is present in said first substantially gas impervious solid electron-conducting membrane in the range of between 30 percent by volume to about 60 percent by volume.

15. The device of claim 13, wherein the first substantially gas impervious solid electron-conducting membrane is a homogeneous mixture of a ceramic oxide and an electron conductor.

16. The device of claim 1, wherein said second substantially gas impervious solid electron-conducting membrane is Ag or a Ag alloy.

17. The device of claim 1, wherein the second substantially gas impervious solid electron-conducting membrane is a mixed metal perovskite oxide having a formula of $ABO_3$ wherein A is one or more of the lanthanides, Y and the rare earth metals and B is one or more of the first row of the transition metals.

18. The device of claim 1, wherein said second substantially gas impervious solid electron-conducting membrane is a two phase material with the first phase a mixed metal oxide having a formula of $ABO_3$ and the second phase one or more of Ag, Au, Pt, Rh, Ni, Cu, Ru, Co, their alloys, their electron-conducting oxides and mixtures thereof.

19. The device of claim 1, wherein said second substantially gas impervious solid electron-conducting membrane is a mixture of Gd doped $CeO_2$ and Ni.

20. The device of claim 1, wherein said second substantially gas impervious solid electron conducting membrane is a mixture of $Y_2O_3$ stabilized $ZrO_2$ and Ni or a Sr—Fe—Co oxide.

21. The device of claim 3, and further including mechanism for subjecting the syngas to a water gas shift reaction at elevated temperature and in the presence of a suitable catalyst to produce carbon dioxide and hydrogen.

22. A method of separating water into hydrogen and oxygen and thereafter reacting the oxygen with methane to produce syngas, comprising providing a first substantially gas impervious solid electron-conducting membrane for selectively passing hydrogen, providing a second substantially gas impervious solid electron-conducting membrane for selectively passing oxygen, and passing steam at dissociation temperature between the first and second impervious solid electron-conducting membranes such that hydrogen from the dissociation of steam selectively and continuously passes through the first substantially gas impervious solid electron-conducting membrane and oxygen from the dissociation of steam selectively and continuously passes through the second substantially gas impervious solid electron-conducting membrane to contact methane, thereby continuously driving the dissociation of steam producing hydrogen and oxygen and producing syngas from the reaction of oxygen and methane.

23. The method of 22, wherein the steam is maintained at a temperature not less than about 400° C.

24. The method of claim 23, wherein said first substantially gas impervious solid electron-conducting membrane is one or more of Pd, Nb, V, Ta, Zr, their alloys and mixtures thereof.

25. The method of claim 24, wherein atomic hydrogen is passed by the first membrane.

26. The method of claim 24, wherein protons are passed through the first membrane and oxygen ions are passed through the second membrane.

27. The method of claim 22, wherein the second substantially gas impervious solid electron-conducting membrane is a mixed metal perovskite oxide having a formula of $ABO_3$ wherein A is one or more of the lanthanides, Y and the rare earth metals and B is one or more of the first row of the transition metals.

28. The method of claim 22, wherein the second substantially gas impervious solid electron-conducting membrane is a mixture of Gd doped $CeO_2$ and Ni or a mixture of $Y_2O_3$ stabilized $ZrO_2$ and Ni or Sr—Fe—Co oxide.

* * * * *